United States Patent [19]

Loshaek et al.

[11] 4,182,802

[45] Jan. 8, 1980

[54] HYDROPHILIC POLYMERS AND CONTACT LENSES OF HIGH WATER CONTENT

[76] Inventors: Samuel Loshaek; Chah M. Shen, both of Chicago, Ill.

[21] Appl. No.: 864,275

[22] Filed: Dec. 27, 1977

[51] Int. Cl.$^2$ .................. C08F 212/08; G02C 7/04
[52] U.S. Cl. .................. 526/264; 351/160 H; 526/262; 526/263
[58] Field of Search .............. 526/262, 263, 264; 351/160 H

[56] References Cited

U.S. PATENT DOCUMENTS

| | | | |
|---|---|---|---|
| 3,532,679 | 10/1970 | Steckler | 260/80.72 |
| 3,639,524 | 2/1972 | Seiderman | 260/885 |
| 3,839,304 | 10/1974 | Hovey | 526/263 |
| 3,937,680 | 2/1976 | de Carle | 260/29.6 TA |
| 3,943,045 | 3/1976 | Cordrey et al. | 204/159.22 |
| 3,949,021 | 4/1976 | Kunitomo et al. | 260/895 |
| 3,985,697 | 10/1976 | Urbach | 260/29.6 TA |
| 4,022,754 | 5/1977 | Howes et al. | 526/264 |
| 4,038,264 | 7/1977 | Rostoker et al. | 526/264 |
| 4,058,491 | 11/1977 | Steckler | 526/263 |

FOREIGN PATENT DOCUMENTS 1391438 4/1975 United Kingdom .
1468977 3/1977 United Kingdom .

*Primary Examiner*—Harry Wong, Jr.

[57] ABSTRACT

Cross-linked hydrophilic interpolymers and contact lenses made therefrom comprising hydrophilic units of which the only or major proportion are derived from an N-vinyl heterocyclic monomer, hydrophobic units derived from the group consisting of styrene and ring-substituted styrenes, and cross-linking units derived from monomers containing two or more polymerizable double bonds per monomer unit.

13 Claims, 1 Drawing Figure

HYDROPHILIC POLYMERS AND CONTACT LENSES OF HIGH WATER CONTENT

BACKGROUND OF THE INVENTION

It is known in the ophthalmological field, that oxygen from the air must be made available to the eye in order to provide for the metabolic needs of the cornea. The placement of an oxygen impermeable contact lens over the cornea can seriously inhibit the transmission of oxygen to it and result in corneal trauma. This situation has been partially alleviated by the so-called pump design of corneal contact lenses which serves to replace the lachrymal fluid under the lens (containing carbon dioxide) with freshly oxygenated lachrymal fluid and thereby make oxygen available to the cornea. The oxygen deficiency problem has been further alleviated by limiting the length of time for which an impermeable lens can be continuously worn, ranging from about four hours to 16 hours of daytime wear depending on the individual, and no wear during sleeping hours. There is also a concomitant need for the carbon dioxide, which is produced by the corneal metabolic processes, to be carried away from the cornea.

It has been found that certain hydrophilic gel contact lenses of high water content have gas permeability orders of magnitude greater than conventional polymethylmethacrylate lenses and provide for the passage of the aforesaid gases through the lens in sufficient amounts to supply corneal metabolic needs. The term "gas permeability" as used herein refers broadly to air, oxygen and carbon dioxide permeability. It has been found, that the gas permeability increases with increasing water content of the hydrophilic polymer from which the contact lens is formed. The increased gas permeability makes possible increased wearing time with increased comfort and absence of most of the undesirable physiological symptoms produced by conventional lens wear.

In order to optimize the foregoing advantages of these hydrophilic lenses, materials with very high water content are desired. However, previously the strength of lenses with very high water contents, e.g., 60%-95% have been found to be low, the strength (resistance to tearing, puncturing, etc . . . ) decreasing progressively with increase in water content. Such lenses are readily damaged during handling, in general are not very durable, and have poorer visual acuity. In some instances such contact lenses can only be inserted and removed by a professional practitioner because of their fragility. Further, the high water content lenses of the prior art cannot withstand repeated heat disinfection or sterilization without deterioration or destruction of the lens. Polymers of the prior art which are of sufficiently high water content to give high gas permeabilities, e.g., about 60%-95% by weight of the combined weight of polymer plus water, and especially above about 70% water content, are very weak and are readily torn or otherwise physically damaged during handling. Such polymers are exemplified in British Pat. No. 1,391,438 and U.S. Pat. Nos. 3,639,524 and 3,943,045. The polymers are prepared from monomer compositions which contain a relatively high amount of cross-linking monomer, the latter being required to prevent the hydrophilic polymer from substantially dissolving in aqueous media. This excessive cross-linking frequently results in a weak polymer.

It has been desired to provide hydrophilic polymers and contact lenses made therefrom which are of high water content, high strength, good durability, high gas permeability and which can be repeatedly disinfected or sterilized by thermal means without deterioration or destruction or impairment of their optical properties.

SUMMARY OF THE INVENTION

Novel hydrophilic polymers and hydrophilic contact lenses made therefrom are provided, which lenses are suitable for extended wear times because they are sufficiently permeable to oxygen to provide for the metabolic needs of the cornea. The lenses can have up to 95% water content with excellent strength and optical properties and high gas permeability.

In addition, the hydrophilic polymers and contact lenses made therefrom, although sufficiently flexible to provide patient comfort are stiffer than those of the prior art for the same water content, thereby providing improved visual acuity, strength, and durability while retaining the same high level of oxygen permeability.

Briefly stated, the present invention comprises cross-linked interpolymers, and contact lenses made therefrom, comprising hydrophilic units derived from N-vinyl heterocyclic monomers, units derived from hydrophobic monomers taken from the group consisting of styrene and ring substituted styrenes, and cross-linking units derived from monomers containing two or more polymerizable double bonds per monomer unit.

The preferred N-vinyl heterocyclic monomer is N-vinyl pyrrolidone and, optionally, other hydrophilic monomers can be used with the N-vinyl heterocyclic monomer as long as the N-vinyl pyrrolidone is present in major amount. Styrene is the preferred hydrophobic monomer and diallyl itaconate the preferred cross-linking monomer.

Contact lenses, such as corneal contact lenses, are made by shaping the hydrophilic polymer in the dry state using conventional and well-known procedures and apparatus and thereafter hydrating the dry lens to the final configuration.

DETAILED DESCRIPTION OF INVENTION

Figure 1:
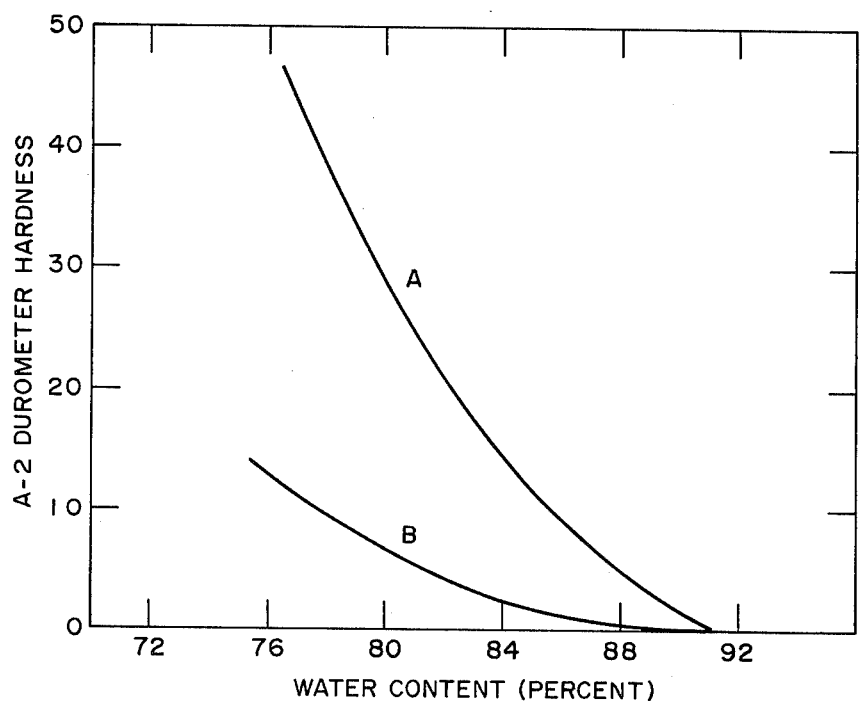
FIG. 1 is a graph showing the hardness of polymers of the present invention at various water contents as compared to polymers of the prior art.

In making a hydrophilic gel contact lens which utilizes the present invention, the hydrophilic interpolymer is made by polymerizing the monomeric ingredients in bulk (with no solvent), preferably in a container such that the resultant interpolymer will be in the form of a solid rod from which can be sliced cylindrical buttons or other convenient shape, the buttons or other shape shaped on a lathe, thereafter polished to form a contact lens, and then the contact lens hydrated in an aqueous medium such as a normal saline solution. The invention provides improved interpolymers and contact lenses made therefrom which in the water content range of 65%-95% are flexible and much stronger than prior art hydrophilic polymers of this high water content. Interpolymers of less than 65% water content can be made by increasing the hydrophobic monomer proportion and correspondingly decreasing the hydrophilic monomer proportion however, the gas permeability of such lenses becomes limiting.

Broadly, the interpolymers contain hydrophilic units, the major proportion of said units being derived from heterocyclic N-vinyl monomers, hydrophobic units derived from hydrophobic monomers from the group consisting of styrene and ring substituted styrenes and cross-linking monomers containing more than one polymerizable double bond therein. Although the hydrophilic units present in major proportion are derived from the N-vinyl heterocyclic monomer, lesser amounts of hydrophilic units derived from other hydrophilic monomers may be added to modify the properties of the interpolymer. The specific monomers and their ranges are more fully described below.

Suitable hydrophilic N-vinyl heterocyclic monomers are N-vinyl pyrrolidones, N-vinyl succinimide, N-vinyl-ε-caprolactam N-vinyl pyrridine and N-vinyl glutarimide. The preferred hydrophilic N-vinyl heterocyclic monomer is N-vinyl-2 pyrrolidone. The foregoing may be used alone or in combination.

The concentration (percent by weight based on the total monomer weight exclusive of cross-linking monomer) of N-vinyl heterocyclic monomers used in the hydrophilic interpolymer, will depend on the water content desired in the swollen gel at equilibrium and the amounts of cross-linking monomers used. When a hydrophobic monomer such as styrene is used, the N-vinyl heterocyclic monomer will range from about 75% for about a 65% water content gel, to about 95% for about a 95% water content gel. A minor portion of the N-vinyl heterocyclic may be substituted with other hydrophilic monomers for specific property modifications of the interpolymer.

Suitable auxiliary hydrophilic monomers include the hydroxy alkyl esters of acrylic and methacrylic acids, such as hydroxyethyl acrylate and methacrylate and hydroxypropyl methacrylate, acrylic, methacrylic, itaconic, fumaric, maleic, and crotonic acids and other olefinic acids which can be copolymerized by free radical mechanism with the other monomers in the interpolymer. The use of small amounts of copolymerizable acids, e.g., up to 5% has been found to sharply increase the water content of the interpolymer. The upper amount of such acids which may be used will be limited by their compatibility with the styrenic hydrophobic monomer. Incompatibility is evidenced as excessive haze in the final interpolymer.

Many types of cross-linking monomers may be employed in preparing the interpolymers of the invention. One class of suitable cross-linking monomers are the methacrylates and acrylates with two or more polymerizable double bonds in the monomer molecule, such as ethylene glycol dimethacrylate, tetraethylene glycol dimethacrylate, 1,6-hexanediol dimethacrylate, polyethylene glycol dimethacrylates, bisphenol A bismethacrylate, trimethylol propane trimethacrylate, glycerol trimethacrylate, pentaerythritol tetramethacrylate, pentaerythritol trimethacrylate and the corresponding acrylates. Another class of suitable cross-linking monomers are the allyl monomers with two or more polymerizable allyl bonds in the monomer molecule, such as diallyl itaconate, diallyl maleate, diallyl fumarate, dimethallyl maleate, diallyl diglycollate, diethylene glycol bis (allyl carbonate), triallyl cyanurate, triallyl isocyanurate, triallyl trimellitate, N,N diallyl melamine, multifunctional allyl monomers formed by the esterification of polybasic acids with allyl alcohol, examples of the latter esters being dially oxalate, diallyl adipate, diallyl succinate, diallyl azelate, diallyl phthalate and diallyl isophthalate. Another class of suitable cross-linking monomers are the mixed allyl-acrylic or allyl-methacrylic types, examples of which are, diallyl itaconate, monoallyl itaconate, allyl methacrylate and allyl acrylate. Other suitable cross-linking monomers are methylene bis-acrylamide, methylene bis-methacrylamide and divinyl benzene. The preferred cross-linking monomers are diallyl itaconate and allyl methacrylate. Mixtures of the foregoing cross-linking monomers may be used without departing from the scope of the invention.

The concentration of cross-linking monomers used in the interpolymer will depend partly on its efficiency. The efficiency as used herein, is characterized by the amount of cross-linking monomer employed to produce a cross-linked structure which is not excessively dissolved away in its aqueous environment. The lower the amount of cross-linker required to provide this non-dissolving structure, the greater is considered to be its efficiency.

A suitable measure of efficiency is provided by measuring the percentage by weight of material which is extracted from the cross-linked interpolymer in an aqueous extracting medium, under some standard conditions of temperature and time. An experimental procedure for evaluating such polymeric gels is set forth below and consists of carrying out successive extractions on the same sample and measuring the percentage of weight loss after each extraction. For a material to be usable for making a contact lens, the weight loss should approach zero after a few such extractions. If the extractibles from a given gel do not approach zero, then it can be expected that the contact lens made from such a material will gradually waste away since at all times in use it is being exposed to an aqueous medium whether in storage or in the eye. Polymers with extractibles as high as 50%–60% may be suitable provided that the state of zero extraction is reached.

The amount of cross-linking monomer employed will also depend on the water content desired in the final interpolymer. The water content is decreased with increasing amounts of cross-linking monomer.

For a hydrophilic interpolymer with a given water content, lower amounts of cross-linking are preferred, i.e., the hydrophobic-hydrophilic monomer balance is utilized as the major means of obtaining the desired water content. Thus, cross-linking monomers of higher efficiency which can be used to give insoluble polymer networks at low concentrations are preferred over the cross-linking monomers of lower efficiency. The type and amount of cross-linking monomer is but one of the variables of composition which determine the properties of the final interpolymer so that selection of their type and amount is not exclusive of the other components of the interpolymer. Specifically, concentrations (percent by weight based on the total weight of monomers exclusive of cross-linking monomer) of cross-linking monomers may range from about 0.01% to about 5% depending on the water content desired. However, a preferred range is 0.01% to 1%.

The principal hydrophobic monomers employed in the interpolymer of the invention are selected from the group consisting of styrene and ring substituted styrenes. Suitable examples are styrene, vinyl toluene, p-methyl styrene, o-methyl styrene, other monoalkyl and dialkyl ring substituted styrenes, chlorostyrene, 2,5-dichlorostyrene, methoxy styrenes and ethoxy styrenes. Mixtures of the aforesaid may be used. Styrene is the preferred hydrophobic monomer. Minor proportions of the styrenic hydrophobic monomers may be substituted with other polymerizable hydrophobic monomers without departing from the scope of the invention. Examples of such other monomers are the alkyl esters of methacrylic and acrylic acids. It is emphasized that the unusual strength of the high water content interpolymers of the present invention, are distinctive and are the result of the use of the styrene monomers as the major hydrophobic monomer component, which must be present in sufficient amount to provide the unique interpolymers.

It is also noted that these interpolymers and contact lenses made therefrom while adequately flexible for patient comfort are less flexible than prior art polymers of the same water content. The lower flexibility at high water content provides for better visual acuity as well as strength and durability. The improved visual acuity may result from the fact that the lens on the cornea does not flex as easily during blinking thereby preventing blurred vision. The foregoing unexpected improvement in properties are obtained without sacrifice in oxygen permeability.

The differences between the polymers of the present invention and those of the prior art are clearly demonstrated in FIG. 1. Here the Type A-2 Durometer hardness measured in accordance with ASTM D-2240-68 on a Shore hardness tester is plotted against water content. It has been found that the Durometer hardness and the flexibility of the polymer correlate well, the lower the Durometer number, the greater the flexibility. Referring to FIG. 1, Curve A was obtained from measurements on polymers of the present invention containing 0.15% cross-linking monomer while Curve B is obtained from measurements on polymers typical of the prior art with the same level of cross-linking. The prior art polymers are based on copolymers of vinyl pyrrolidone and methyl methacrylate. It is readily seen, that at the same water content Curve A is representative of polymers with lower flexibility. In spite of this, the oxygen permeability at the same water content does not differ.

As to the amount of styrenic monomer employed, it has been found that the strongest polymeric gels are obtained if the interpolymer contains about the maximum amount of hydrophobic monomer consistent with the water content of the interpolymer, i.e., the cross-linking monomer is kept as low as is practical. Specifically, when the preferred hydrophobic monomer styrene is employed, the interpolymer contains about 25% for a water content of about 65% and about 5% for a water content of about 95% for cross-linking monomer contents in the range of about 0.01 to 0.5%. When other ring substituted styrene monomers are used, adjustments are made in the amounts depending on the hydrophobicity of the particular substituted styrene. Thus, vinyl toluene is used in sightly smaller amounts to produce an interpolymer of like water content.

The interpolymers of the invention are formed by the use of conventional free radical polymerization procedures. Typical free radical initiators can be used. Examples are benzoyl peroxide, di-t-butyl peroxide, t-butyl perbenzoate, (2,5-dimethyl-2,5-bis(2-ethyl hexoyl peroxy) hexane) lauroyl peroxide, t-butyl hydroperoxide, azobisisobutyronitrile, diisopropyl peroxydicarbonate, t-buty-peroxypivalate, and the like. The amounts employed are conventional and are such as to give a controlled polymerization at conventional polymerization temperatures. As noted, the polymerization method and conditions, as well as the apparatus, are conventionally employed and detailed discussion is not deemed necessary. Moreover, these conditions are not intended to limit the scope of the present novel polymers and contact lenses.

Strong, durable hydrophilic gel contact lenses of excellent optical properties are made practical by the improved hydrophilic polymers of this invention which give high water content gels of concomittantly high gas permeability. These contact lenses are particularly adapted and useful for extended continuous daytime wear and even through sleeping hours for many individuals. These contact lenses can be handled by the patient with little danger of damaging them. The contact lenses can be repeatedly disinfected by thermal or chemical means or sterilized by steam under pressure. The dry interpolymer prior to hydration has good machineability so that contact lenses can be readily shaped therefrom.

The contact lenses can be formed from the unhydrated hydrophilic polymer by any of the conventional lens lathing and polishing processes, followed by any of the conventional hydration procedures used in this art.

The invention will be further described in connection with the following examples which are given for the purposes of illustration only and in which proportions are by weight unless expressly stated to the contrary.

The polymerization and hydration-extraction procedure used to make the interpolymers and polymeric gels and the physical tests used to evaluate the polymers of the examples were as follows:

A. Polymerization Procedure

The monomers, cross-linker, and initiator, 0.4% of 2,5-dimethyl-(2,5-bis(2-ethyl hexoyl peroxy) hexane), based on the weight of the monomers exclusive of cross-linking monomer, were weighed in a flask mixed, and deaerated for 15 minutes. The mixture was then poured into a 25 mm diameter test tube within 1 cm from the top, sealed with a cap and placed in a 35° C. water bath. The tube was maintained in the bath for three days beyond the time that gelation of the monomers took place. The tube was then removed from the bath and heated in an oven at 50° C. for 24 hours, 70° for four hours, and finally at 110° for two hours. The heat was then turned off and the tube cooled gradually to room temperature. The glass tube was then broken and a solid rod of polymer was obtained.

B. Hydration-Extraction Procedure

Cylindrical discs of 0.4 inch×0.05 inch thickness were cut from each rod and sanded smooth. The weighed discs (dry weight) were placed in an aqueous hydration medium at 95° C. for four hours, then cooled to room temperature. The discs were then placed in an aqueous medium for seven days, whereupon the wet weight of the discs was determined. After drying at 110° C. overnight the discs were weighed again to give the redry weight. The water content in percent is calculated from 100X (wet wt.—redry wt.)/(wet wt.) and the extractible in percent is given by 100X (dry wt.—redry wt.)/(dry wt.). The hydration-extractions were repeated until no further substantial weight loss occurred, usually two or three extractions.

C. Oxygen Permeability

The oxygen permeability of each material was measured on hydrated lenses. An oxygen flux meter was used. The details of this measurement is described in "Polarographic Oxygen Sensors" by I. Fatt, published by CRC Press, 1976. This meter provides an electric current reading which is proportional to the amount of oxygen passing through the lens. The permeability units set forth in Table I below are in:

diallyl itaconate as DAI, and allyl methacrylate as AMA.

TABLE I

| Examples | Water Content % | Composition (% by Wt.) VP | STY | DAI | MAA | AMA | Permeability | % Extr.[1] | Strength Rating | % Extensibility |
|---|---|---|---|---|---|---|---|---|---|---|
| 1 | 95 | 95 | 5 | 0.15 | 0 | 0 | 52 | 12 | 3 | 80 |
| 2 | 90 | 90 | 10 | 0.05 | 0 | 0 | 47 | 17 | 3 | 40 |
| 3 | 60 | 95 | 5 | 3.00 | 0 | 0 | 14 | 7 | 5 | <40 |
| 4 | 85 | 90 | 10 | 0.20 | 0 | 0 | 39 | 18 | 5 | 40 |
| 5 | 85 | 87.5 | 12.5 | 0.10 | 0 | 0 | 39 | 11 | 5 | 40 |
| 6 | 83 | 85 | 15 | 0.10 | 0 | 0 | 35 | 13 | 6-7 | 40 |
| 7 | 81 | 85 | 15 | 0.15 | 0 | 0 | 33 | 8 | 7 | <40 |
| 8 | 80 | 90 | 10 | 0.50 | 0 | 0 | 31 | 15 | 7 | <40 |
| 9 | 77 | 80 | 20 | 0.10 | 0 | 0 | 28 | 8 | 9 | <40 |
| 10 | 74 | 90 | 10 | 1.00 | 0 | 0 | 24 | 15 | 6 | <40 |
| 11 | 68 | 85 | 15 | 1.00 | 0 | 0 | 19 | 20 | 7 | <40 |
| 12 | 82 | 90 | 10 | 0 | 0 | 0.50 | 34 | 9 | 6 | 40 |
| 13 | 80 | 84 | 16 | 0 | 0 | 0.20 | 31 | 11 | 7 | <40 |
| 14 | 74 | 90 | 10 | 0 | 0 | 1.00 | 24 | 10 | 6 | <40 |
| 15 | 70 | 85 | 15 | 0 | 0 | 1.00 | 20 | 12 | 7 | <40 |
| 16 | 81 | 77 | 20 | 0.10 | 3 | 0 | 33 | 10 | 7 | <40 |
| 17 | 88 | 83 | 15 | 0.10 | 2 | 0 | 44 | 10 | 3-4 | 40 |
| 18 | 79 | 78 | 20 | 0.10 | 1 | 0 | 30 | 12 | 7 | <40 |
| 19 | 78 | 79 | 20 | 0.10 | 1 | 0 | 31 | 11 | 8 | <40 |

[1] Percent by weight extracted from the polymer usually after three extractions; no substantial increase in extractibles was noted between the last and next-to-last extraction.

$$\frac{cm^2}{sec} \cdot \frac{ml\ O_2 \times 10^{11}}{ml\ mm\ Hg}$$

D. Strength and Extensibility Rating

Hand pull tests were performed on hydrated contact lenses of 0.2 mm center thickness and 14 mms diameter. The lens was grasped by both hands between thumb and forefinger so that there was about a 7 mm distance between the thumbs. The lens was pulled over a scale graduated in mms and the elongation at break noted. The percent elongation is the ratio of the final length over the original length multiplied by 100. The control lens was a commercial gel lens of the polyhydroxyethyl methacrylate type (tradename DuraSoft) of 0.2 mm center thickness and 30% water content. Its strength rating is 10 on a scale of 0 to 10 which corresponds to about 10 kg/cm² tensile strength and its elongation at break is about 400%. Lenses with strength ratings of at least about 2-3 are desirable for practical use. The lenses made from the polymers of the invention are strong but have relatively low extensibilities. The lower extensibility is not a disadvantage with lenses of such high strength.

E. Type A-2 Durometer

ASTM method No. D-2240-68 was used. Measurements were made on a shore hardness tester and the instantaneous value utilized.

The composition of polymers is given in percent by weight of the monomers in the interpolymers exclusive of the cross-linking monomer. The amount of cross-linking monomer is in percent by weight based on 100 parts of the polymer exclusive of the cross-linking monomer.

EXAMPLES 1 TO 19

A series of interpolymers and lenses were made and tested as described above having varying compositions. The composition of each polymer and test results are set forth in Table I in which vinyl pyrrolidone is abbreviated as VP, methacrylic acid as MA, styrene as STY,

EXAMPLE 20

A polymer consisting of 90 parts vinyl pyrrolidone, 10 parts of vinyl toluene and 0.5 parts of divinyl benzene was made and tested according to the procedures set forth above. The hydrated polymer gave an 80% water content and 18% extractables. The polymer was used to make hydrophilic contact lenses which were of good quality.

EXAMPLE 21

The experiment of Example 20 was repeated except that the vinyl toluene was replaced with an equal weight of styrene. The hydrated polymer gave a water content of 81% and 16% extractables. The hydrated lens made from it was of good quality and slightly greater clarity than that of Example 20.

EXAMPLE 22

A polymer consisting of 82 parts of vinyl pyrrolidone, 18 parts of styrene and one part of divinyl benzene was made according to the procedure set forth above. The hydrated polymer gave a water content of 60% and 16% extractables and a satisfactory hydrated contact lens was made therefrom.

EXAMPLE 23

Example 22 was repeated except that two parts of the styrene were replaced with two parts of methyl methacrylate. The hydrated polymer gave a water content of 66% and 22% extractables. This demonstrates that the small amount of methyl methacrylate reduced the hydrophobic effect of the styrene. The hydrophilic contact lens made from the polymer of this example was of slightly lower strength than that of Example 22, but was satisfactory.

EXAMPLE 24

Example 16 was repeated in preparing a series of polymers except that the methacrylic acid was replaced, separately and in turn, with an equal weight of acrylic acid, itaconic acid, maleic anhydride, crotonic acid, and fumaric acid. In each case, hydrated polymer of similar properties was obtained.

EXAMPLE 25

Example 4 was repeated except that 10 parts of the vinyl pyrrolidone was replaced with an equal weight of hydroxyethyl methacrylate. A suitable polymer of slightly higher water content and slightly lower strength was obtained.

EXAMPLE 26

Example 4 was repeated in preparing two polymers except that the diallyl itaconate was successively replaced with an equal weight of monoallyl itaconate and a mixture of 80% diallyl itaconate and 20% monoallyl itaconate. Suitable hydrated polymers were obtained in each instance.

EXAMPLE 27

Example 4 was repeated in preparing a series of polymers with the exception that the vinyl pyrrolidone was replaced, separately and in turn, with an equivalent weight of N-vinyl succinimide, N-vinyl-ε-caprolactam, N-vinyl pyridine, and N-vinyl glutarimide. Suitable hydrophilic polymers were obtained in each case.

EXAMPLE 28

The polymerization procedure set forth above was used to prepare the compositions of Examples 7 and 12 except that the initiator was replaced successively with 0.3% of 2-bisazoisobutyronitrile and 0.3% benzoyl peroxide. In all cases interpolymers with equivalent properties were obtained.

EXAMPLE 29

Example 12 was repeated with the exception that 0.5 parts of diallyl itaconate was replaced, separately and in turn, with an equal weight of ethylene glycol dimethacrylate, 1,6 hexanediol diacrylate, diallyl maleate, diallyl diglycollate, triallyl cyanurate, N,N diallyl melamine, methylene bis acrylamide, diallyl adipate, and diallyl phthalate. In all instances, similar suitable polymers were obtained.

EXAMPLE 30

A pair of contact lenses of appropriate base curve radius, diameter and optometric specifications was prepared from the composition of Example 4 by lathing. The lenses were hydrated according to the procedure described above. The resulting lenses when placed on a patient's eyes provided excellent comfort and vision, and after proper adaptation, the lenses could be worn continuously for up to several weeks without removing them.

EXAMPLE 31

Example 7 is repeated with the exception that the vinyl pyrrolidone content used is 75% by weight and the styrene content is 25% by weight. A hydrated lens is made from this copolymer. The lens has a water content of 65% and an oxygen permeability of about $$15 \times 10^{-11} \frac{cm^2 \, ml \, O_2}{sec \, ml \, mm \, Hg}.$$

The lens is fairly rigid and strong and cannot be pulled apart by application of the hand test.

While the invention has been described in connection with preferred embodiments, it is not intended to limit the invention to particular forms set forth, but, on the contrary, it is intended to cover such alternatives, modifications and equivalents as may be included within the spirit and scope of the invention as defined by the appended claims.

What is claimed is:

1. A contact lens adapted for extended wear hydrated to a water content of about 60% to 95% and having an oxygen permeability of at least about $$15 \times 10^{-11} \frac{cm^2 \, ml \, O_2}{sec \, ml \, mm \, Hg},$$

a tensile strength of at least about 2 kg/cm², and an elongation at break of at least 40% consisting essentially of the polymerization reaction product of at least one hydrophilic monomer, at least one hydrophobic monomer and at least one cross-linking monomer, the major hydrophilic monomer being an N-vinyl heterocyclic monomer selected from N-vinyl pyrrolidone, N-vinyl succinimide, N-vinyl-ε-caprolactam, N-vinyl pyridine, N-vinyl glutarimide, or mixtures thereof, the major hydrophobic monomer being selected from styrene, ring-substituted styrenes, or mixtures thereof, and the cross-linking monomer being selected from monomers containing two or more polymerizable double bonds per monomer unit.

2. The contact lens of claim 1 wherein the N-vinyl heterocyclic monomer is N-vinyl-2 pyrrolidone.

3. The contact lens of claim 1 wherein the interpolymer includes an auxiliary hydrophilic monomer selected from the $C_1-C_4$ hydroxyalkyl esters of acrylic or methacrylic acid and olefinic acids which can be copolymerized by free radical polymerization with the other monomers in the interpolymer.

4. The contact lens of claim 1 wherein the N-vinyl heterocyclic monomer is used in a concentration of from about 80% to 95% by weight, the hydrophobic monomer in a concentration of about 5% to 25%, and cross-linking monomer in a concentration of from about 0.01% to 5%, the percents by weight being based on the total weight of monomers exclusive of cross-linking monomer.

5. The contact lens of claim 1 wherein the N-vinyl heterocyclic monomer is N-vinyl-2-pyrrolidone in a concentration of about 75% to 95% by weight, the hydrophobic monomer is styrene in a concentration of about 5% to 25%, and the cross-linker is diallyl itaconate in a concentration of about 0.01% to 5% by weight, the percents by weight being based on the total weight of monomers exclusive of cross-linking monomer.

6. A contact lens adapted for extended wear, hydrated to a water content of about 65% to 95% water and having an oxygen permeability of at least about $$15 \times 10^{-11} \frac{cm^2 \, ml \, O_2}{sec \, ml \, mm \, Hg},$$

a tensile strength of from about 2 to 8 kg/cm², and an elongation at break of from about 40% to 400%, consisting essentially of an interpolymer shaped to fit the eye, said interpolymer consisting essentially of the bulk polymerization reaction product of 75% to 95% of an N-vinyl heterocyclic monomer selected from N-vinyl pyrrolidone, N-vinyl succinimide, N-vinyl-ε-caprolactam, N-vinyl pyridine, N-vinyl glutarimide, or mixtures thereof, 5% to 25% of a hydrophobic monomer selected from styrene, ring-substituted styrenes, or mixtures thereof, and 0.01% to 5% of a cross-linking monomer having more than one polymerizable double bond, the percentage being percent by weight based on the total weight of the monomers exclusive of the cross-linking monomer.

7. The contact lens of claim 6 wherein the N-vinyl heterocyclic monomer is N-vinyl-2 pyrrolidone, the hydrophobic monomer is styrene, and the cross-linking monomer is diallyl itaconate.

8. The contact lens of claim 6 wherein the N-vinyl heterocyclic monomer is N-vinyl-2 pyrrolidone, the hydrophobic monomer is styrene, and the cross-linking monomer is allyl methacrylate.

9. A contact lens adapted for extended wear, hydratable to a water content of about 60% to 95% water and when so hydrated having an oxygen permeability of at least about $$15 \times 10^{-11} \frac{cm^2 \, ml \, O_2}{sec \, ml \, mm \, Hg},$$

a tensile strength of at least about 2 kg/cm², and an elongation at break of at least 40%, consisting essentially of the polymerization reaction product of at least one hydrophilic monomer, at least one hydrophobic monomer and at least one cross-linking monomer, the major hydrophilic monomer being an N-vinyl heterocyclic monomer selected from N-vinyl pyrrolidone, N-vinyl succinimide, N-vinyl-ε-caprolactam, N-vinyl pyridine, N-vinyl glutarimide, or mixtures thereof, the major hydrophobic monomer being selected from styrene, ring-substituted styrenes, or mixtures thereof, and the cross-linking monomer being selected from monomers containing two or more polymerizable double bonds per monomer unit.

10. The contact lens of claim 9 wherein the N-vinyl heterocyclic monomer is N-vinyl-2 pyrrolidone.

11. The contact lens of claim 9 wherein the interpolymer includes an auxiliary hydrophilic monomer selected from the $C_1$-$C_4$ hydroxyalkyl esters of acrylic or methacrylic acid and olefinic acids which can be copolymerized by free radical polymerization with other monomers in the interpolymer.

12. The contact lens of claim 9 wherein the N-vinyl heterocyclic monomer is used in a concentration of from about 80% to 95% by weight, the hydrophobic monomer in a concentration of about 5% to 25%, and cross-linking monomer in a concentration of from about 0.01% to 5%, the percents by weight being based on the total weight of monomers exclusive of cross-linking monomer.

13. The contact lens of claim 9 wherein the N-vinyl heterocyclic monomer is N-vinyl-2-pyrrolidone in a concentration of about 75% to 95% by weight, the hydrophobic monomer is styrene in a concentration of about 5% to 25%, and the cross-linker is diallyl itaconate in a concentration of about 0.01% to 5% by weight, the percents by weight being based on the total weight of monomers exclusive of cross-linking monomer.

* * * * *